(12) United States Patent
Belenko et al.

(10) Patent No.: US 7,509,682 B2
(45) Date of Patent: Mar. 24, 2009

(54) COPY PROTECTION METHOD AND SYSTEM FOR DIGITAL MEDIA

(75) Inventors: Vyacheslav S. Belenko, St. Petersburg (RU); Vsevolod M. Kuzmich, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 713 days.

(21) Appl. No.: 10/061,363

(22) Filed: Feb. 4, 2002

(65) Prior Publication Data

US 2002/0118838 A1 Aug. 29, 2002

Related U.S. Application Data

(60) Provisional application No. 60/265,890, filed on Feb. 5, 2001.

(51) Int. Cl.
*H04K 1/00* (2006.01)
*H04L 9/00* (2006.01)
*G06F 11/30* (2006.01)

(52) U.S. Cl. .............. 726/26; 705/57; 705/59; 380/277; 713/193

(58) Field of Classification Search ........... 713/193; 726/26; 705/57, 59; 380/277
See application file for complete search history.

(56) References Cited

U.S. PATENT DOCUMENTS

| | | | |
|---|---|---|---|
| 5,809,139 A | | 9/1998 | Girod et al. |
| 5,974,150 A | | 10/1999 | Kaish et al. |
| 6,044,462 A | * | 3/2000 | Zubeldia et al. ............. 713/158 |
| 6,148,342 A | * | 11/2000 | Ho ............................. 709/225 |
| 6,226,618 B1 | | 5/2001 | Downs et al. |
| 6,229,894 B1 | * | 5/2001 | Van Oorschot et al. ...... 713/150 |
| 6,246,767 B1 | | 6/2001 | Akins, III et al. |
| 6,310,956 B1 | | 10/2001 | Morito et al. |
| 6,358,596 B1 | | 3/2002 | Mehta et al. |
| 6,367,019 B1 | * | 4/2002 | Ansell et al. ................ 713/201 |
| 6,385,596 B1 | | 5/2002 | Wiser et al. |
| 6,389,403 B1 | | 5/2002 | Dorak, Jr. |
| 6,398,245 B1 | | 6/2002 | Gruse et al. |
| 6,404,926 B1 | | 6/2002 | Miyahama et al. |

(Continued)

OTHER PUBLICATIONS

Bender et al.; "Techniques for Data Hiding" IBM Systems Journal; vol. 35, Nos. 3&4; pp. 313-336, 1996.

(Continued)

*Primary Examiner*—Christopher J Brown
(74) *Attorney, Agent, or Firm*—Ked & Associates, LLP

(57) ABSTRACT

A copy protection method and a copy protection system are disclosed. The system includes a private key verifier receiving a media certificate that includes a private-key identification of a compliant playing device and searching for an actual private key by checking whether each of available private keys of the playing device corresponds to the private-key identification, a media key decryptor receiving an encrypted media key and decrypting the media key with the actual private key, and a media data decryptor receiving an encrypted media data set and decrypting the media data set with the decrypted media key. The method and system of the present invention are applicable to all types of digital media data, and it makes no assumption of any specific media properties. The primary goal of the present invention is to significantly reduce the possibility of making any illegal copies on any nonstandard equipment and is to restrict the media data transfers only to authorized entities.

25 Claims, 2 Drawing Sheets

U.S. PATENT DOCUMENTS

| | | |
|---|---|---|
| 6,418,421 B1 | 7/2002 | Hurtado et al. |
| 6,550,011 B1 * | 4/2003 | Sims, III .................... 713/193 |
| 6,611,599 B2 | 8/2003 | Natarajan |
| 6,611,607 B1 | 8/2003 | Davis et al. |
| 6,633,723 B1 | 10/2003 | Kuroda et al. |
| 6,678,389 B1 | 1/2004 | Sun et al. |
| 6,678,464 B1 | 1/2004 | Kawai et al. |
| 6,687,822 B1 | 2/2004 | Jakobsson |
| 6,707,774 B1 | 3/2004 | Kuroda et al. |
| 6,741,991 B2 | 5/2004 | Saito |
| 6,802,011 B1 | 10/2004 | Ogino |
| 6,853,676 B2 | 2/2005 | Kim |
| 6,891,958 B2 | 5/2005 | Kirovski et al. |
| 7,000,113 B1 | 2/2006 | Linnartz |
| 7,002,710 B1 | 2/2006 | Van Liew et al. |
| 7,047,554 B1 | 5/2006 | Lortz |
| 7,100,048 B1 * | 8/2006 | Czajkowski et al. ........ 713/168 |
| 2001/0010046 A1 | 7/2001 | Muyres et al. |
| 2001/0032312 A1 | 10/2001 | Runje et al. |
| 2001/0053223 A1 | 12/2001 | Ishibashi et al. |
| 2002/0010861 A1 | 1/2002 | Matsuyama et al. |
| 2002/0021805 A1 | 2/2002 | Schumann et al. |
| 2002/0071566 A1 | 6/2002 | Kurn |
| 2002/0118838 A1 | 8/2002 | Belenko et al. |
| 2002/0191809 A1 | 12/2002 | Kirovski et al. |
| 2003/0048922 A1 | 3/2003 | Rhoads |
| 2004/0034781 A1 | 2/2004 | Natarajan |
| 2004/0059936 A1 | 3/2004 | Wakao et al. |
| 2004/0131184 A1 | 7/2004 | Wu et al. |
| 2005/0018873 A1 | 1/2005 | Rhoads |
| 2005/0058318 A1 | 3/2005 | Rhoads |
| 2005/0097333 A1 | 5/2005 | Kirovski et al. |
| 2005/0097334 A1 | 5/2005 | Kirovski et al. |
| 2005/0196013 A1 | 9/2005 | Rhoads |

OTHER PUBLICATIONS

F.Hartung and M. Kutter; Multimedia Watermarking Techniques; Proc. IEEE, vol. 87, No. 7; pp. 1079-1107; Jul. 1999.

Wolfgang et al.; "Overview of image security techniques with applications in multimedia systems"; Proceedings of the SPIE Conference on Multimedia Networks: Security, Displays, Terminals, and Gateways, vol. 3228, Nov. 2-5, 1997; Dallas, Texas; pp. 297-308.

* cited by examiner

COPY PROTECTION METHOD AND SYSTEM FOR DIGITAL MEDIA

CROSS-REFERENCE TO RELATED APPLICATIONS

This application claims the benefit of U.S. Provisional Application No. 60/265,890, filed on Feb. 5, 2001, in the name of inventors Vyacheslav S. Beleko and Vsebolod M. Kumich, titled "Cryptography Architecture for Digital Media Protection Technology", which is hereby incorporated by reference as if fully set forth herein.

BACKGROUND OF THE INVENTION

1. Field of the Invention

The present invention relates to media copy protection, and more particularly, to digital media copy protection method and system that prevent any unauthorized access to a digital media data set using a hybrid cryptographic technique.

2. Discussion of the Related Art

Communication systems such as computer networks, telecommunication systems, and other systems are increasingly using cryptography for the security of information. There are two main classes of cryptographic systems: symmetric key and public key cryptographic systems. In a symmetric key cryptographic system, a symmetric (secrete) key is used for both of data encryption and decryption processes. There are several efficient implementations of the symmetric key cryptographic systems, but the actual key managements of such implementations are often troublesome.

On the other hand, in a public key cryptographic system, the data encryption and decryption processes are independent from each other. That is, the data encryption process requires a public key, often designated as e, while the data decryption process requires a different (but mathematically related) private key d. Therefore, an entity being possessed of the public key may encrypt a plaintext, which is the original form of a message, but the entity may not be able decrypt a ciphertext, which is the encrypted form of the message.

If an entity selects a public key and publishes the public key, anyone is able to use the key to encrypt one or more messages for the entity. Then the entity keeps his private key secret so that he or she is the only one who can decrypt the ciphertexts of the messages. The implementations of the public key cryptographic systems are currently less efficient than those of the symmetric key cryptographic systems, but they are much safer.

In a hybrid cryptographic system, a plaintext is encrypted with a symmetric key corresponding to a symmetric algorithm. The symmetric key is then encrypted with a public key having a public algorithm. When a receiver receives the public key-encrypted symmetric key and the symmetric key-encrypted data, the receiver initially decrypts the symmetric key by using his own private key. Subsequently, the receiver decrypts the encrypted data by using the decrypted symmetric key. The processes of obtaining the original data in a hybrid cryptographic system are usually faster than those of the public key cryptographic system. In addition, a hybrid cryptographic system may allow using a different symmetric key each time, considerably enhancing the security of the symmetric algorithm. For that reason, the hybrid cryptographic systems are ideal for transferring the protected media data safely to a receiver.

SUMMARY OF THE INVENTION

Accordingly, the present invention is directed to a copy protection method and system for digital media data that substantially obviates one or more problems due to limitations and disadvantages of the related art.

An object of the present invention is to provide a copy protection method that prevents any unauthorized access to a digital media data set by using a hybrid cryptographic technique and a media certificate.

Another object of the present invention is to provide a copy protection system that prevents any unauthorized access to a digital media data set by using a hybrid cryptographic technique and a media certificate.

Additional advantages, objects, and features of the invention will be set forth in part in the description which follows and in part will become apparent to those having ordinary skill in the art upon examination of the following or many be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a copy protection method for digital media includes (a) encrypting an original media data set with a media key corresponding to a symmetric algorithm and encrypting the media key with a public key of a compliant playing device; (b) delivering the media data set and media key encrypted in the step (a) and a media certificate to the playing device, the certificate including a private-key identification of the playing device, the private-key identification being encrypted with the public key; and (c) decrypting the private-key identification.

The method further includes (d) searching for an actual private key by checking whether each of stored private keys of the playing device corresponds to the decrypted private-key identification; (e) decrypting the delivered media key with the actual private key; and (f) decrypting the delivered media data set with the decrypted media key.

In another aspect of the present invention, a copy protection system for digital media includes a private key verifier receiving a media certificate that includes a private-key identification of a compliant playing device and searching for an actual private key by checking whether each of available private keys of the playing device corresponds to the private-key identification; and a media key decryptor receiving an encrypted media key and decrypting the media key with the actual private key; and a media data decryptor receiving an encrypted media data set and decrypting the media data set with the decrypted media key.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding or the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
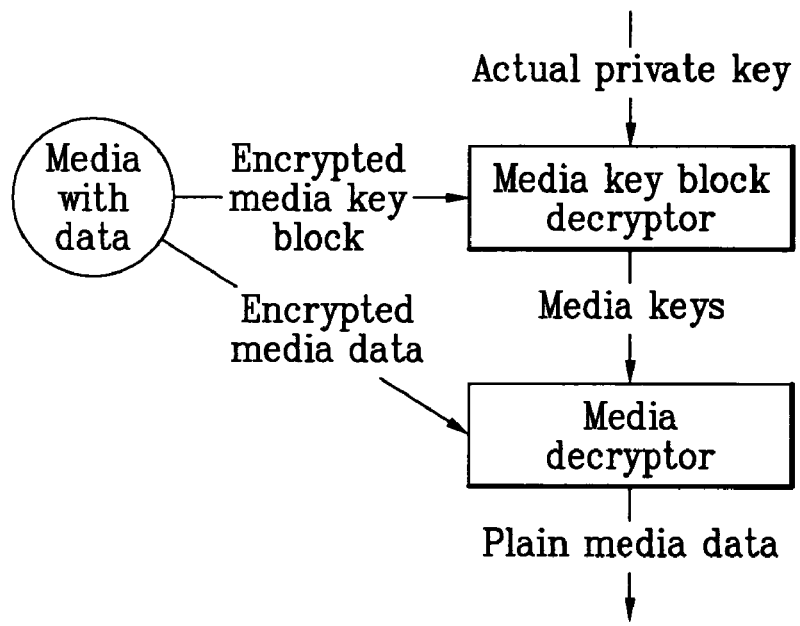
FIG. 1 illustrates the media data decryption process according to the present invention.

The media protection method according to the present invention, which is shown in FIG. 1, is based on general hybrid cryptographic principles. In a hybrid cryptographic system, a media data set is encrypted with a media (symmetric) key having a symmetric algorithm, and the media key is also encrypted. The encryption of the media key is performed independently for each compliant devices public key. Then the encrypted media data set and media key are delivered to one or more target playing devices.

When one of the playing devices plays the received media data set, the device uses its own private key to decrypt the encrypted media key. Subsequently, the device uses the decrypted media key to decrypt the encrypted media data set. These processes are shown in FIG. 1. The cryptographic levels of the public-key encryption of the media key and the media-key encryption of the media data set are chosen so that the encrypted data are safe enough to resist against any known types of attacks.

In general, different groups of devices have different private keys. The device grouping principles are out of the scope of the present invention. When a media data act is delivered to devices having different private keys, the data set, must contain several different samples of the media key, one for each device's private key. Then each device must be able to recognize its own encrypted sample in order to obtain a valid media key. This can be done in a digital media format-specific manner.

In addition, each device may have several available private keys due to any key revocation processes: a current private key and several revoked private keys. A media data set currently being played by a playing device may be a new data set or an old data set that was played previously. In order to recognize a valid private key among the available keys in such case, a media certificate included in the media data set can be used.

Every media data set contains several media certificates, one for each group of devices having a same private key. A media certificate includes the media identification and the private key identification of a group of devices. The private key identification is generated by encrypting the media identification with the public key of each device. In this way, each compliant device can easily recognize its own private key by decrypting the media identification and, comparing the recognized key with the original one.

Figure 2:
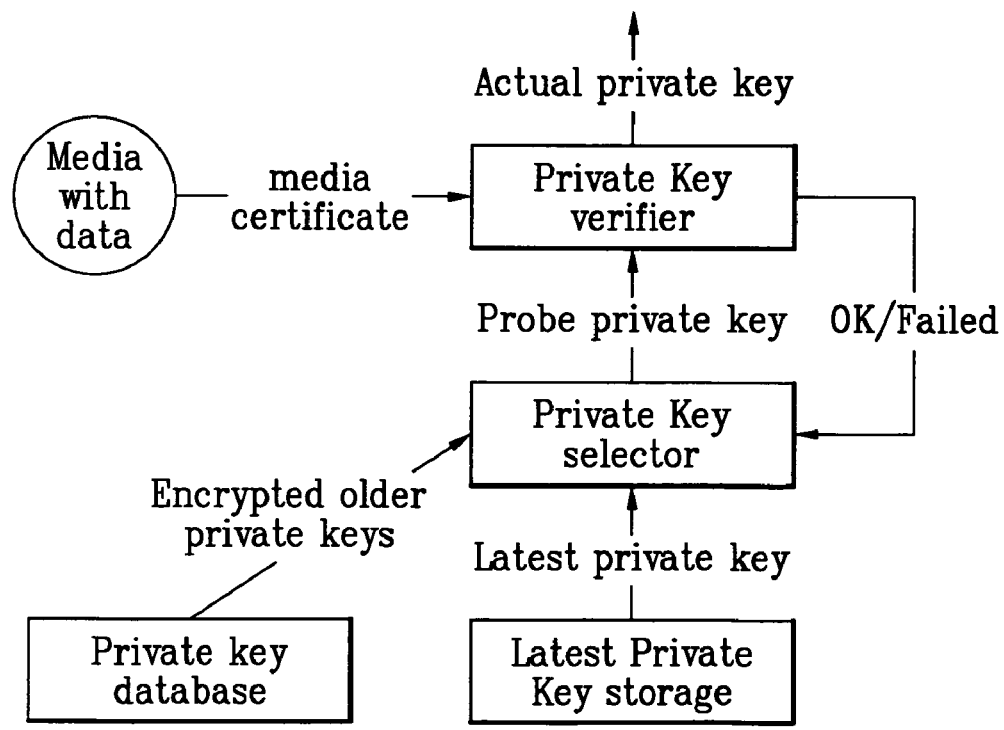
FIG. 2 illustrates the process of extracting an actual private key by using a Media certificate n accordance with the present invention.

A playing device must have a secure and rewritable memory storage for storing all the older private keys. All the data stored in this memory storage must be encrypted with a current public key, Before the playing device plays a media data set, it initiates an appropriate private key search process, which is shown in FIG. 2. As it is shown in the figure, all the stored private keys including a current private key are tested with a media certificate until a "right" private key is found. If no "right" key is found, the media, data set is considered as being unplayable.

For compromising a, private key of a, device, a keyrenewing certificate can be delivered to the device together with a media data set. The storage of the key-renewing certificate on the media data set is out of the scope of the present invention. The key-renewing certificate contains a pair of new public and private keys of the device, which are encrypted with a master public key of the device. The master public key and its corresponding master private key of the device are stored inside of the device. For the security reasons, the master private key of the device must be encrypted with a current public key of the device. The certificate further contains time marks for sequencing the public and private keys from the oldest to the newest, respectively.

Figure 3:
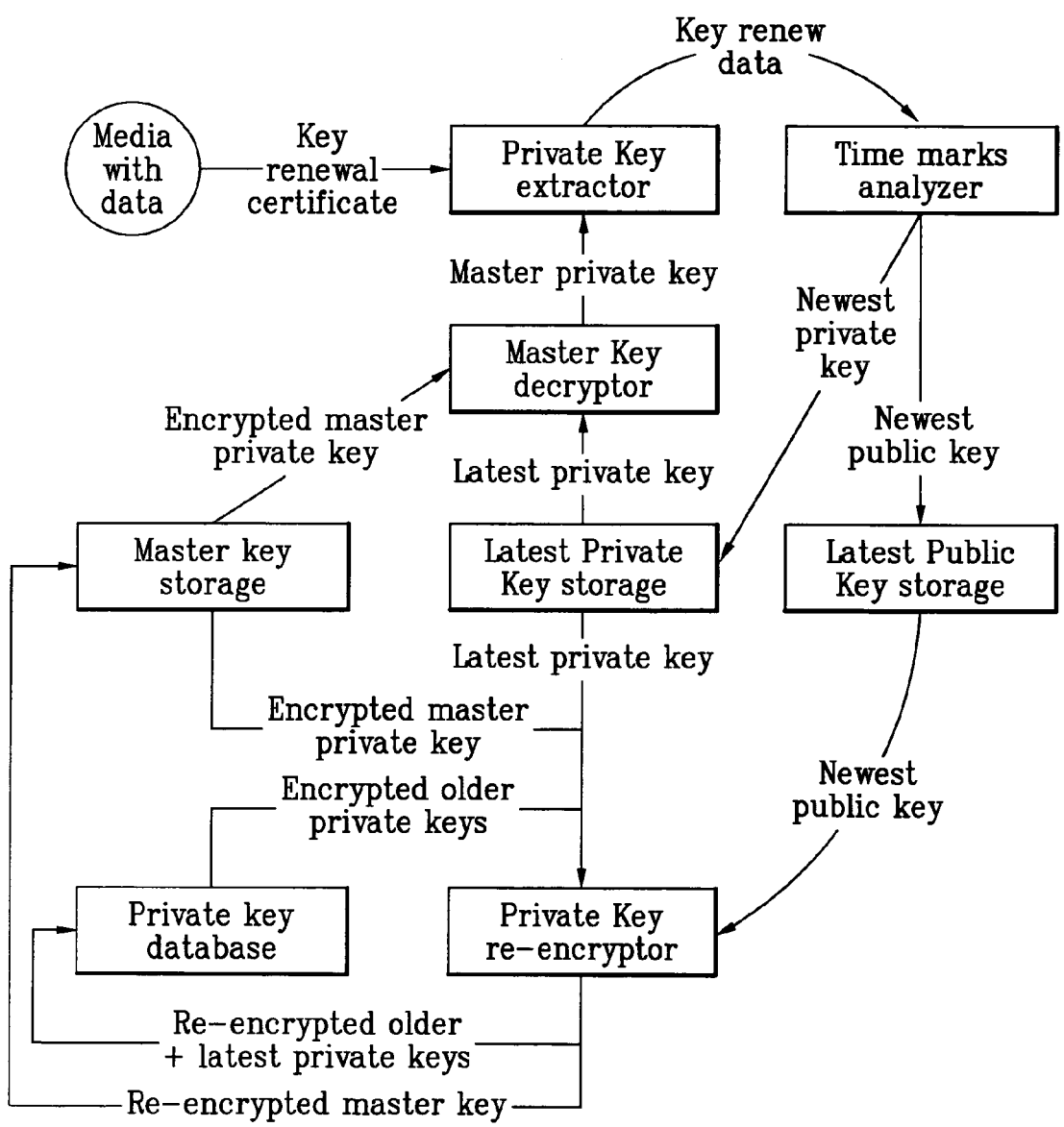
FIG. 3 illustrates the automatic key-renewing process according to the present invention.

First, a key-renewing certificate is processed by using a device master key, and the time marks are analyzed. If the issued key-renewing certificate is the newest one, the extracted public and private keys replace the older key pair. The previous private key is included in a private key history and database, and the whole database and a master private key are re-encrypted with a new public key. This process is illustrated in FIG. 3.

A master key compromise of a device is very improbable, but it does not mean that it never happens. If it occurs by any chance, a new media data set must be issued with key-renewing certificates associated with a new master key, and any device the media data set is subjected to replace its master key with the customer service.

It will be apparent to those skilled in the art that various modifications and variations can be made in the present without departing from the spirit or scope of the inventions. Thus, it is intended that the present invention covers the modifications and variations of this invention provided they come within the scope of the appended claims and their equivalents.

What is claimed is:

1. A copy protection method for digital media, the method comprising the steps of:

(a) encrypting an original media data set with a media key corresponding to a symmetric algorithm and encrypting said media key with a public key of a compliant playing device;

(b) delivering said media data set, media key encrypted in the step (a), a media certificate, and a key renewing certificate to said playing device, said media certificate being required to recognize by said playing device a valid private key among a plurality of private keys stored in said playing device and including a private-key identification and media identification of said playing device, said private-key identification being generated by encrypting said media identification with said public key of said playing device, wherein said key renewing certificate is required to update a private key of said playing device and including a pair of new public key and private key of said playing device and a time mark for sequencing said public and private keys from the oldest to the newest, respectively;

(c) searching for an actual private key using said private-key identification and said media identification;

(d) decrypting said delivered media key with said actual private key; and (e) decrypting said delivered media data set with said decrypted media key;

(f) processing said key renewing certificate using a master private key of said playing device, and analyzing said time mark;

(g) replacing a pair of current public and private keys of said playing device with said pair of new public and private keys if said key renewing certificate is the newest one as a result of analysis; and (h) encrypting said master private key with said new public key of said playing device.

2. The method of claim 1, wherein said stored private keys include said current private key and one or more old private keys, each of said old private keys being previously revoked through a key revocation process.

3. The method of claim 2, wherein said playing device includes a rewritable memory storing said old private keys.

4. The method of claim 3, wherein said old private keys being stored in said memory are encrypted with said public key.

5. The method of claim 1, wherein, in step (b), said pair of new public and private keys are encrypted with a master public key of said playing device and delivered to said playing device.

6. The method of claim 1, wherein step (f) comprises decrypting an encrypted master private key with said current private key of said playing device into said master private key.

7. A copy protection system for digital media, the system comprising:

a private key verifier configured to receive a media certificate and a key renewing certificate, said media certificate including a private-key identification of a compliant playing device and searching for an actual private key by checking whether each of available private keys of said playing device corresponds to said private-key identification, wherein said media certificate is required to recognize by said playing device the actual private key among a plurality of private keys stored in said playing device, wherein said key renewing certificate is required to update a private key of said playing device and includes a pair of new public key and private key of said playing device and a time mark for sequencing the public and private keys from the oldest to the newest, respectively, wherein said key renewing certificate is required to update a private key of said playing device;

a media key decryptor configured to receive an encrypted media key and decrypting said media key with said actual private key;

a media data decryptor configured to receive an encrypted media data set and decrypt said media data set with said decrypted media key; and a processor configured to process said key renewing certificate using a master private key of said playing device, analyze the time mark, replace a pair of current public and private keys of said playing device with said pair of new public and private keys if said key renewing certificate is the newest one as a result of the analysis, and encrypt said master private key with said new public key of said playing device.

8. The system of claim 7, wherein said available private keys include said current private key and one or more old private keys, each of said old private keys being previously revoked through a key revocation process.

9. The system of claim 8, further comprising a data-rewritable memory configured to store said one or more old private keys.

10. The system of claim 9, where said old private keys being stored in said memory are encrypted with a public key of said playing device.

11. The system of claim 7, wherein said encrypted media key is encrypted with a public key of said playing device.

12. The system of claim 7, wherein said encrypted media data set is encrypted with an original media key.

13. The system of claim 7, wherein said key verifier is configured to receive said pair of new public and private keys encrypted with a master public key of said playing device.

14. The system of claim 7, wherein said processor comprises a master key decryptor configured to decrypt an encrypted master private key with said current private key of said playing device into said master private key.

15. A copy protection method for digital media, the method comprising:

(a) encrypting an original media data set with a media key and encrypting said media key with a public key of a compliant playing device;

(b) delivering the encrypted media data set, the encrypted media key a media certificate, and a key renewing certificate to said playing device, the media certificate being required to recognize by said playing device a valid private key among a plurality of private keys stored in said playing device, wherein said key renewing certificate is required to update a private key of said playing device and including a pair of new public key and private key of said playing device and a time mark for sequencing the public and private keys from the oldest to the newest, respectively;

(c) identifying the valid private key among private keys stored in said playing device in response to said media certificate;

(d) decrypting said delivered media key with the valid private key identified as a result of the step (c);

(e) decrypting said delivered media data set with said decrypted media key;

(f) processing said key renewing certificate using a master private key of said playing device, and analyzing the time mark;

(g) replacing a pair of current public and private keys of said playing device with said pair of new public and private keys if said key renewing certificate is the newest one as a result of analysis; and (h) encrypting said master private key with said new public key of said playing device.

16. The method of claim 15, wherein said stored private keys include said current private key and one or more old private keys, each of said old private keys being previously revoked through a key revocation process.

17. The method of claim 15, further comprising:

not permitting a playback of the media data set when the valid private key is not identified as a result of step (c).

18. The method of claim 15, wherein, in step (b), said pair of new public and private keys are encrypted with a master public key of said playing device and delivered to said playing device.

19. The method of claim 15, wherein step (f) comprises decrypting an encrypted master private key with said current private key of said playing device into said master private key.

20. A copy protection method for digital media, the method comprising:

(a) receiving an encrypted media data set, an encrypted media key, a media certificate, and a key renewing certificate, wherein said encrypted media set is generated by encrypting an original media data set with a media key, said encrypted media key is generated by encrypting said media key with a public key of a compliant playing device, and said media certificate is required to recognize a valid private key among a plurality of private keys stored in said playing device, wherein said key renewing certificate is required to update a private key of said playing device and includes a pair of new public key and private key of said playing device and a time mark for sequencing the public and private keys from the oldest to the newest, respectively;

(b) identifying the valid private key among each of stored private keys of said playing device in response to said media certificate; and (c) decrypting said received media key with the valid private key identified by the step (b), and decrypting said received media data set with said decrypted media key;

(d) processing said key renewing certificate using a master private key of said playing device, and analyzing the time mark;

(e) replacing a pair of current public and private keys of said playing device with said pair of new public and private keys if said key renewing certificate is the newest one as a result of said analyzing; and (f) encrypting said master private key with said new public key of said playing device.

21. The method of claim 20, wherein said stored, private keys include said current private key and one or more old private keys, each of said old private keys being previously revoked through a key revocation process.

22. The method of claim 20, further comprising:

not permitting a playback of the media data set when the valid private key is not identified as a result of step (b).

23. The method of claim 20, wherein the previous private key is included in a private key history and database when replacing the keys as a result of step (e).

24. The method of claim 20, wherein, in step (a), said received pair of new public and private keys is encrypted with a master public key of said playing device.

25. The method of claim 20, wherein step (d) comprises decrypting an encrypted master private key with said current private key of said playing device into said master private key.

* * * * *